(12) United States Patent
Javaid et al.

(10) Patent No.: US 8,638,690 B2
(45) Date of Patent: Jan. 28, 2014

(54) ACCESS POINT AND NODE FOR CONTROLLING ROUTING IN A HYBRID NETWORK

(75) Inventors: Usman Javaid, Newbury (GB); Toufik Ahmed, Talance (FR); Djamal-Eddine Meddour, Lannion (FR)

(73) Assignee: France Telecom, Paris (FR)

( * ) Notice: Subject to any disclaimer, the term of this patent is extended or adjusted under 35 U.S.C. 154(b) by 1045 days.

(21) Appl. No.: 12/669,945

(22) PCT Filed: Jul. 18, 2008

(86) PCT No.: PCT/FR2008/051364
§ 371 (c)(1),
(2), (4) Date: Jan. 20, 2010

(87) PCT Pub. No.: WO2009/016308
PCT Pub. Date: Feb. 5, 2009

(65) Prior Publication Data
US 2010/0220632 A1 Sep. 2, 2010

(30) Foreign Application Priority Data
Jul. 20, 2007 (FR) ...................................... 0756647

(51) Int. Cl.
H04L 12/28 (2006.01)
(52) U.S. Cl.
USPC ............ 370/254; 370/401; 709/220; 709/238
(58) Field of Classification Search
None
See application file for complete search history.

(56) References Cited

U.S. PATENT DOCUMENTS

| 5,506,838 | A | * | 4/1996 | Flanagan | 370/258 |
| 6,954,435 | B2 | * | 10/2005 | Billhartz et al. | 370/252 |
| 7,522,537 | B2 | * | 4/2009 | Joshi | 370/254 |
| 2006/0104210 | A1 | * | 5/2006 | Nielsen | 370/248 |
| 2007/0070959 | A1 | * | 3/2007 | Almeroth et al. | 370/338 |
| 2011/0002226 | A1 | * | 1/2011 | Bhatti | 370/248 |

OTHER PUBLICATIONS

L. Tonghong et al., "Seamless Multi-hop Handover in IPv6 Based Hybrid Wireless Networks", Internet Article, pp. 1-10, http://www.springerlink.com/content/ejy2xgyml11nm7bn/fulltext.pdf, 2005.
A. Hamidian, et al., "Performance of Internet Access Solutions in Mobile Ad Hoc Networks", Internet article, pp. 1-13, http://www.telecom.lth.se/Personal/alexh/Dagstuhl_Final11.pdf, Apr. 4, 2008.
E.M. Hossam et al., "Gateway Discovery in Ad hoc On-Demand Distance Vector (AODV), Routing for Internet Connectivity", National Radio Science Conference, pp. 1-8, XP031177378, Mar. 2007.

* cited by examiner

Primary Examiner — Brian Roberts
(74) Attorney, Agent, or Firm — Knobbe Martens Olson & Bear LLP

(57) ABSTRACT

An access point (30) for controlling routing in a hybrid network includes a topology table including routes to nodes registered on request with the access point and routes to nodes that have responded to an advertisement message broadcast by this access point (30) only to nodes having a predetermined status and means for selecting a route from all possible routes between a source node (S) and a destination node (D) determined from the above-mentioned response messages. Only nodes that have not contributed to routing a registration request respond to the advertisement message.

13 Claims, 7 Drawing Sheets

| Source | Destination | Route | QoS profile | QoS availability |
|--------|-------------|-------|-------------|------------------|
| S | D | S-I-J-D | voice | Delay = 150ms, Bit Rate = 100kbps |

36

| ID_N | Next | State | Valid |
|------|------|-------|-------|
| S | S/I | R | 1 |
| D | O | R | 1 |
| C | S | N | 1 |
| I | I/S/O | N | 1 |
| O | O | I | 1 |
| J | O | I | 1 |
| G | O | N | 1 |
| ... | ... | | |

ACCESS POINT AND NODE FOR CONTROLLING ROUTING IN A HYBRID NETWORK

RELATED APPLICATIONS

This is a U.S. National Phase Application under 35 USC §371 of International Application PCT/FR2008/051364 filed on Jul. 18, 2008.

This application claims the priority of French application Ser. No. 07/56647 filed on Jul. 20, 2007, and the content of which is hereby incorporated by reference.

BACKGROUND OF THE INVENTION

The present invention relates to the field of routing in hybrid telecommunications networks also known as wireless mesh networks (WMN).

Such networks enable ad hoc mobile telecommunications networks to interface with an infrastructure network via access points (or gateways), where an ad hoc network is one in which mobile units called "nodes" are free to move around and to communicate wirelessly with another.

Hybrid networks serve, in particular, to solve the known scaling and performance problems of ad hoc mobile networks. Moreover, the infrastructure network integrated with the ad hoc network considerably strengthens control and security.

The nodes in a hybrid network covered by the same access point form an ad hoc network. When two ad hoc networks overlap, even partially, they form a larger ad hoc network.

In a hybrid network, a message sent by a source node to a destination node can be routed end-to-end within the ad hoc network or via the access points.

The invention is more particularly directed to searching for the best route for routing a message between a source node and a destination node in a hybrid network.

Considerable research has been done on the problem of determining a routing protocol that is effective in a hybrid network.

Existing solutions at present can be classified in two categories.

In solutions in the first category, each node of the network uses its own topology search algorithms and maintains its knowledge of the topology itself. These solutions are not modular and consume computation power in each of the nodes, which can be a problem when the nodes have limited energy resources. Moreover, the total traffic generated by all the nodes for the purposes of such control can become very high if the number of nodes increases.

In the second category of solutions, each node of the network periodically informs the access point about the states of the relevant links, the access point using this information to maintain knowledge of the entire topology of the network. Continuous updating of the entire topology of the network by the access point requires a very large quantity of control traffic dedicated exclusively to this purpose. Now, it is legitimate to consider that at any given time not all nodes are active, i.e. likely to communicate with another node or with an access point. Such solutions therefore generate unnecessarily control packets that are highly redundant.

OBJECT AND SUMMARY OF THE INVENTION

A first aspect of the invention proposes a method of processing an advertisement message broadcast in a hybrid telecommunications network by an access point with which at least one first node of the network has been registered by sending a registration request.

This method, suitable for being used by a second node of said network, includes:
- a step of the second node sending the access point a response message to the advertisement message; and
- a first verification step during which the second node verifies that it has a status representing the fact that it has not contributed to routing a registration request, the sending step being effected only if the verification first step is successful.

A second aspect of the invention proposes a method of selecting a route between a source node and a destination node suitable for being used by an access point in a hybrid telecommunications network, this method including:
- on receiving a registration request sent by at least one node of said access network, a step of registering in a topology table of said access point an identifier of said node and a route between said node and said access point;
- a step of receiving messages sent by nodes of said network in response to an advertisement message broadcast by said access point to only those nodes having a predetermined status, said received message including a route between the node sending the message and said access point; and
- a step of selecting a route from all possible routes between said source node and said destination node determined from said received response messages.

According to an embodiment of the invention, the topology of the hybrid network is kept up-to-date by the access points. This feature advantageously centralizes the routing algorithms in the access points and solves the performance and modularity problems of existing solutions in the first category.

According to an embodiment of the invention, updating of the topology by the access point is based on control messages sent by only some nodes of the network, which considerably limits congestion of the network for the purposes of topology control compared to the solutions in the second category.

In one implementation of the invention, the processing method includes:
- a second verification step during which said second node verifies that it has a status representing the fact that it is registered with said access point or the fact that it has contributed to routing said registration request of said at least one first node toward said access point; and
- if said second verification step is successful, a step of forwarding said advertisement message to at least one node of said network taking into account a broadcasting depth included in said advertisement message.

In one implementation, the topology table contains information relating to nodes belonging to an active area. In the context of the invention, the expression "active area" means a set of nodes including at least one node registered with the access point, intermediate nodes that serve as relays for a registered node, and nodes receiving this advertisement message.

In one implementation of the invention, the selection method includes a step during which the access point registers in said topology table a route between the node sending the message and the access point extracted from said received message.

Routes extracted in this way enable the access point to deduce possible routes between the source node and the destination node even if they do not pass through the access point.

In one particular implementation, the advertisement message is broadcast by the access point with a depth of one hop and relayed by nodes of the network having a predetermined status. The messages relayed can also be relayed with a depth of one hop.

In one particular implementation of the invention, the nodes authorized to relay the advertisement message are:
- nodes with status R, i.e. nodes registered with the access point; and
- nodes with status I, namely the intermediate nodes, an intermediate node being a node that is on a route taken by the registration message from another node to the access point.

As stated above, only some nodes are stored in the topology table of the access point. Consequently, it can happen that a destination node is not registered there.

In this situation, in one particular implementation of the invention, if the access point does not know the destination node the selection method includes a first step of searching for the destination node near at least one other access point.

This first search therefore uses the connections between access points and does not cause congestion of the ad hoc network.

In one particular implementation of the invention, if the first search step fails, the selection method includes a second step of searching for the destination node using a ring-based search mechanism. One such mechanism is used in the AODV (Ad-hoc On-demand Distance Vector) routing protocol defined in the document RFC (Request For Comments) 3561.

This mechanism is therefore used only as a last resort. This very efficient algorithm is known to have the major drawback of overloading the network with a very large number of control messages.

The person skilled in the art therefore realizes that the invention is highly advantageous compared to all solutions that systematically use the ring-based search mechanism to search for a destination node, whether that search mechanism is executed by an access point or by the nodes themselves.

In a preferred implementation of the invention, the route selection step takes account of at least:
- the number of hops between said source node and said destination on each of said possible routes; or
- whether one possible route passes through said access point or not; or
- a quality of service on each of said possible routes evaluated as a function of a type of application contained in said route request.

In one particular implementation of the invention, the various steps of the selection method and/or the method of processing an advertisement message are determined by computer program instructions.

Consequently, one aspect of the invention provides a computer program on an information medium and adapted to be executed in an access point or more generally in a computer, the program including instructions adapted to execute the steps of a selection method as described above.

Another aspect of the invention provides a computer program on an information medium, which program can be executed in a node or more generally in a computer, the program including instructions adapted to execute the steps of a message processing method as described above.

This program may use any programming language and take the form of source code, object code, or a code intermediate between source code and object code, such as a partially compiled form or any other desirable form.

Another aspect of the invention provides a computer-readable information medium containing instructions of a computer program as referred to above.

The information medium may be any entity or device capable of storing the program. For example, the medium may comprise storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which can be routed via an electrical or optical cable, by radio or by other means. The program of the invention may in particular be downloaded over an Internet-type network.

Alternatively, the information medium may be an integrated circuit in which the program is incorporated, the circuit being adapted to execute the method in question or to be used in its execution.

Another aspect of the invention provides an access point that can be used in a hybrid telecommunications network. This access point includes:
- means for registering in a topology table of said access point an identifier of at least one node of said network and a route between said node and said access point on receiving a registration request sent by that node;
- means for receiving messages sent by nodes of said network in response to an advertisement message broadcast by said access point to only those nodes having a predetermined status, said received message including a route between the sending node and said access point;
- means for registering said route in said topology table in association with an identifier of said sending node;
- means for receiving a request sent by said source node to obtain a route to said destination node;
- means for selecting a route from all possible routes between said source node and said destination node determined from said received response messages; and
- means for sending said source node a message including said selected route.

Another aspect of the invention provides a node usable in a hybrid telecommunications network including an access point with which at least one first node of said network has been registered by sending a registration request, said node including:
- means for receiving an advertisement message broadcast by said access point and possibly relayed by another node of said network;
- means for verifying whether the node has a status representing the fact that it has not contributed to routing a registration request; and
- means for sending said access point a response message to said advertisement message if said verification is successful.

Another aspect of the invention provides a hybrid network including at least one access point and at least one node as referred to above.

The advantages and features of the access point, the node, and the network of the invention are the same as those mentioned above with reference to the selection method and the message processing method. They are therefore not repeated here.

BRIEF DESCRIPTION OF THE DRAWINGS

FIGS. 8 to 10 show topology data stored by an access point of one particular implementation of the invention at different stages in the execution of the invention.

DETAILED DESCRIPTION OF THE DRAWINGS

Figure 1:
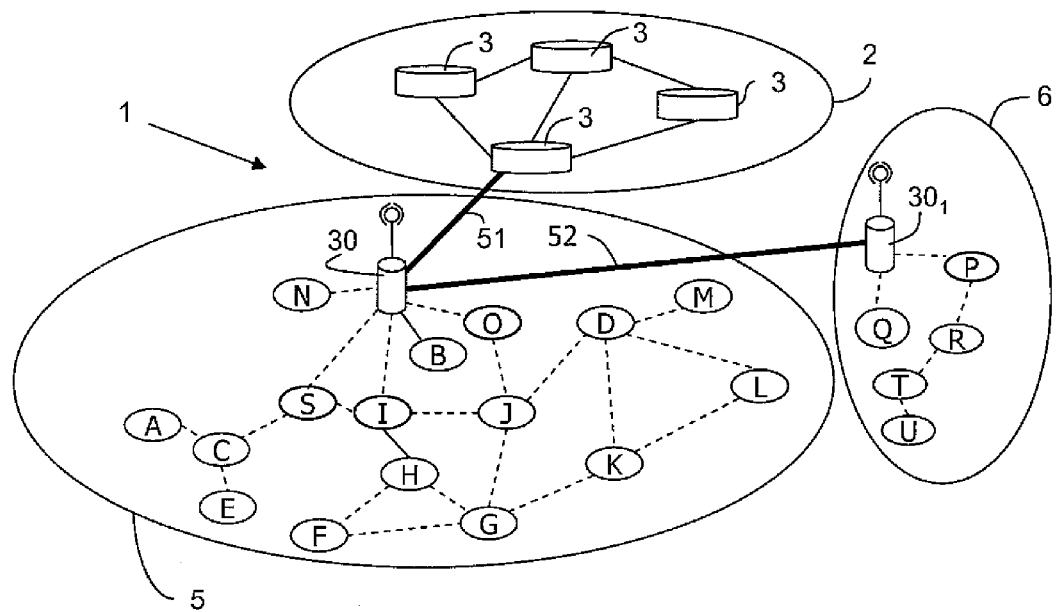
FIG. 1 represents an access point of one embodiment of the invention in its environment.

FIG. 1 represents an access point 30 in its environment in one particular embodiment of the invention.

A method of the invention can be used in a hybrid network 1.

This hybrid network 1 consists of a fixed infrastructure network 2 and two ad hoc networks 5 and 6.

In the example described here, the fixed infrastructure network 2 is the Internet.

The ad hoc networks 5 and 6 are connected to respective access points 30, 30$_1$.

These access points are interconnected by a wired connection 52.

In the example described here, the access point 30 is connected to an entity 3 of the Internet 2 by a wired connection 51.

In the example described here, the aim is to select a route for routing data between a source node S and a destination node D of the ad hoc network 5.

Figure 2:
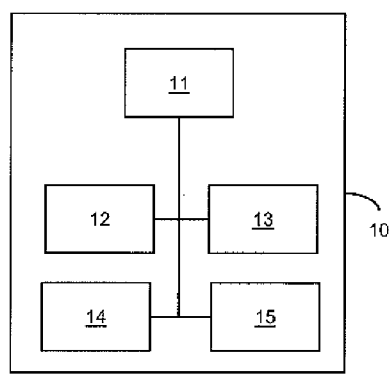
FIG. 2 represents diagrammatically the hardware architecture of a node that can be used in one embodiment of the invention.

In the example described here, all nodes A to U of the hybrid network 1 are identical. They have the hardware architecture of a standard computer 10 that is described below with reference to FIG. 2.

Such a computer includes a processor 11, a random-access memory (RAM) 12, a read-only memory (ROM) 13, and telecommunication means 14 for communicating with the other nodes of the ad hoc network and with the access points 30, 30$_1$.

The read-only memory 13 contains a computer program of the invention including instructions for executing the steps of the method of one implementation of the invention of processing an advertisement message the main steps of which are described with reference to FIGS. 4 to 6.

A state or status of a node is defined relative to the access point. In the implementation described here, it can take three values:

R (registered): the node has effected a phase of registration with the access point; this registration phase is described below;

I (intermediate): the node has served as a relay during a phase of registration of another node;

N (null): all other situations.

Each node also includes a routing table 15 in which it stores in particular its status. On powering up, the status of a node is N (null status).

Figure 3:
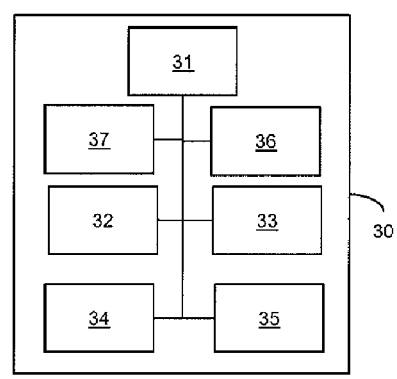
FIG. 3 represents diagrammatically the hardware architecture of an access point of one embodiment of the invention.

FIG. 3 represents diagrammatically the access point 30, the access point 30$_1$ being identical. It includes a processor 31, a random-access memory (RAM) 32, and a read-only memory (ROM) 33. The read-only memory 33 contains a computer program of the invention including instructions for executing the steps of the selection method of one particular implementation of the invention, the main steps of which are described with reference to FIGS. 4 to 7.

The access point 30, 30$_1$ also includes wired telecommunication means 34 adapted to communicate with another access point and an entity 3 of the Internet 2.

The access point 30, 30$_1$ also includes wireless telecommunication means 37 for communicating with nodes of the ad hoc network in its coverage area.

The access point 30, 30$_1$ also includes a topology table 35 storing the status of certain nodes of the network forming an active area and information necessary for it to identify all possible routes between two nodes registered in the table.

In the context of the invention, the expression "active area" means a set of nodes including at least one node registered with the access point (status R), intermediate nodes (status I) that serve as relays for at least one registered node, and nodes receiving an advertisement message broadcast by the access point. The method of determining said nodes is described below.

The access point 30, 30$_1$ also includes a table of active connections 36 in the ad hoc network 5, 6.

How a node is registered with the access point 30 in one particular implementation of the invention is described below with reference to FIG. 4.

Registering a node involves the node that is to be registered, the access point 30, and other nodes of the ad hoc network 5 if the node to be registered is more than one hop away from the access point 30.

Figure 4:
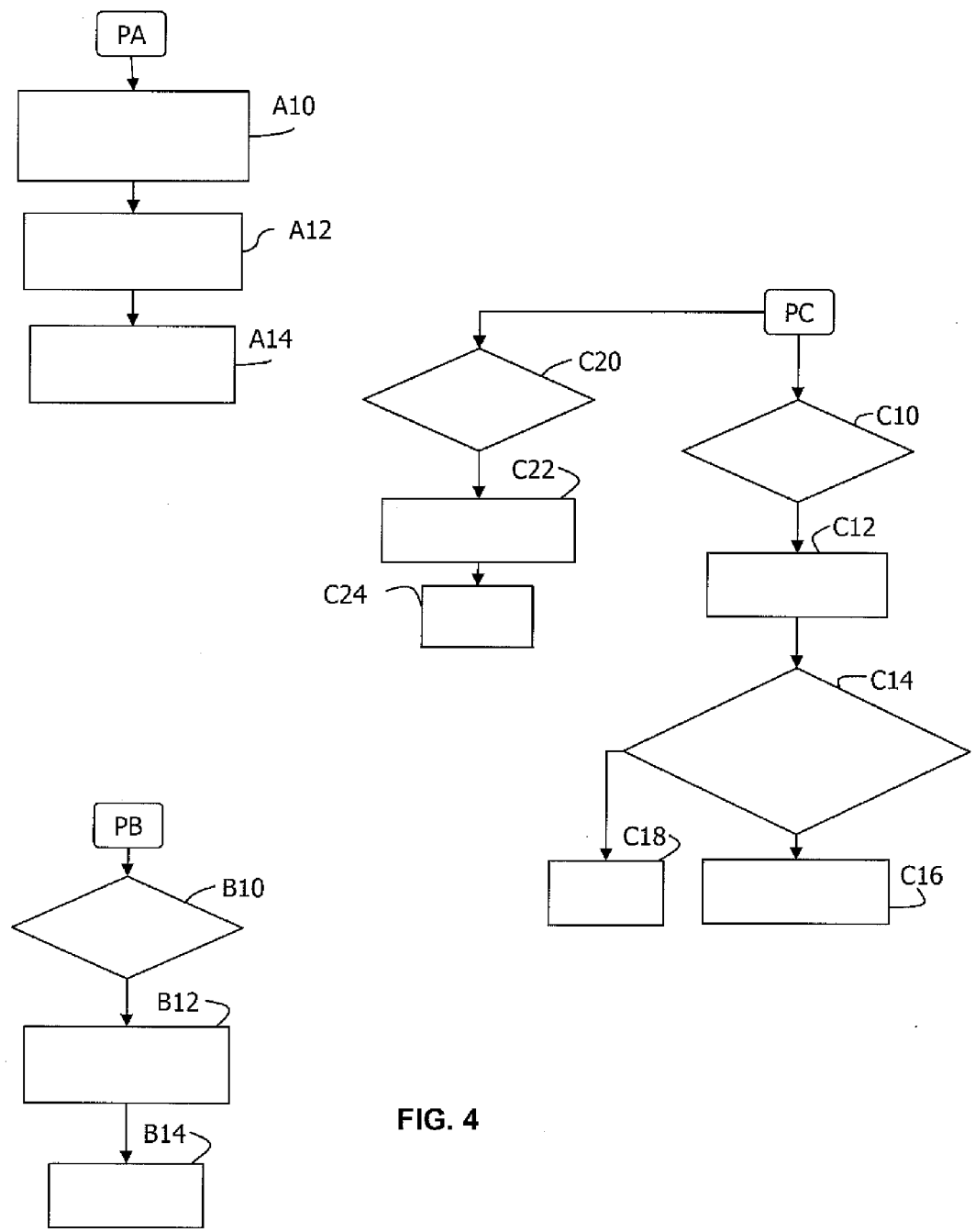
FIG. 4 represents in flowchart form the main steps of registering a node with an access point of one particular implementation of the invention.

FIG. 4 represents in flowchart form the processes PA (steps A10 to A14), PB (steps B10 to B14), and PC (steps C10 to C24) respectively executed at registration time by the node that is to be registered, the access point 30, and the other nodes of the network.

It is assumed that the node to be registered has already discovered the access point 30. The discovery mechanism is described below with reference to FIG. 5.

During a step A10, the node that is to be registered broadcasts a registration request (Route Request) RREQ the source address of which is the address ID_N of this node and the destination address of which is that of the access point 30.

If another node receives this message RREQ during a step C10, it updates its routing table 15 during a step C12 to enter therein a route between it and the node sending the request RREQ.

Then, during a test C14, the node that received the request RREQ determines by reading its routing table 15 if it already knows a route to the access point 30.

If so, the result of the test C14 is positive and the node sends the request RREQ to the access point 30 over that route during a step C16.

If not, the result of the test C14 is negative and the node broadcasts the request RREQ in the ad hoc network 5 during a step C18.

It is assumed that the access point 30 receives the request RREQ during a step B10.

Then, during a step B12, it stores in its topology table 35, in a record associated with the node that sent the request RREQ:

the identifier ID_N corresponding to the source address of the request RREQ;

the first node on the route between the access point 30 and the node sending the request RREQ, i.e. the last node that sent the request RREQ; and the status R representing the fact that the node sending the request RREQ is registered with an access point 30 and is an active node in the sense of the present document.

A node registered with an access point is an active node in the sense of this document.

Figure 8:
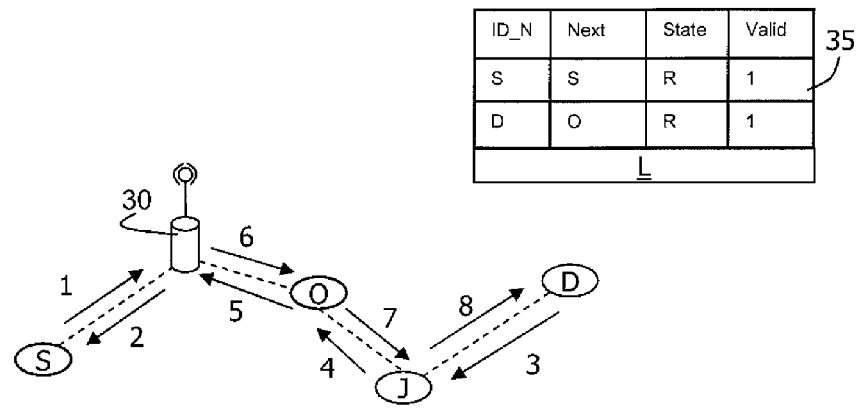

This information is stored in respective ID_N, Next, and Status columns shown in FIG. 8 in particular.

Then, during a step B14, the access point 30 sends a message RREP (Route Reply) to the node that it has just registered via the first node on the route between the access point 30 and the destination node, the destination address of this message being the address ID_N of this node and its source address being that of the access point 30.

If a node receives this message RREP during a step C20, it stores in its routing table 15 during a step C22 its status I representing the fact that it is an intermediate node in the sense of this document, i.e. that it has contributed to routing a registration request from another node.

During a step C24, it determines by reading its routing table 15 the identity of the node enabling it to reach the destination node of the message RREP and sends it that message.

The node that is the source of the registration request RREQ finally receives the response message RREP during a step A12.

In the step A14 it updates its routing table 15 and stores therein its new status R representing the fact that it is registered in the topology table 35 of the access point 30.

How an access point 30, $30_1$ and the topology of the hybrid network 1 are discovered in one particular implementation of the invention is described below with reference to FIG. 5.

Figure 5:
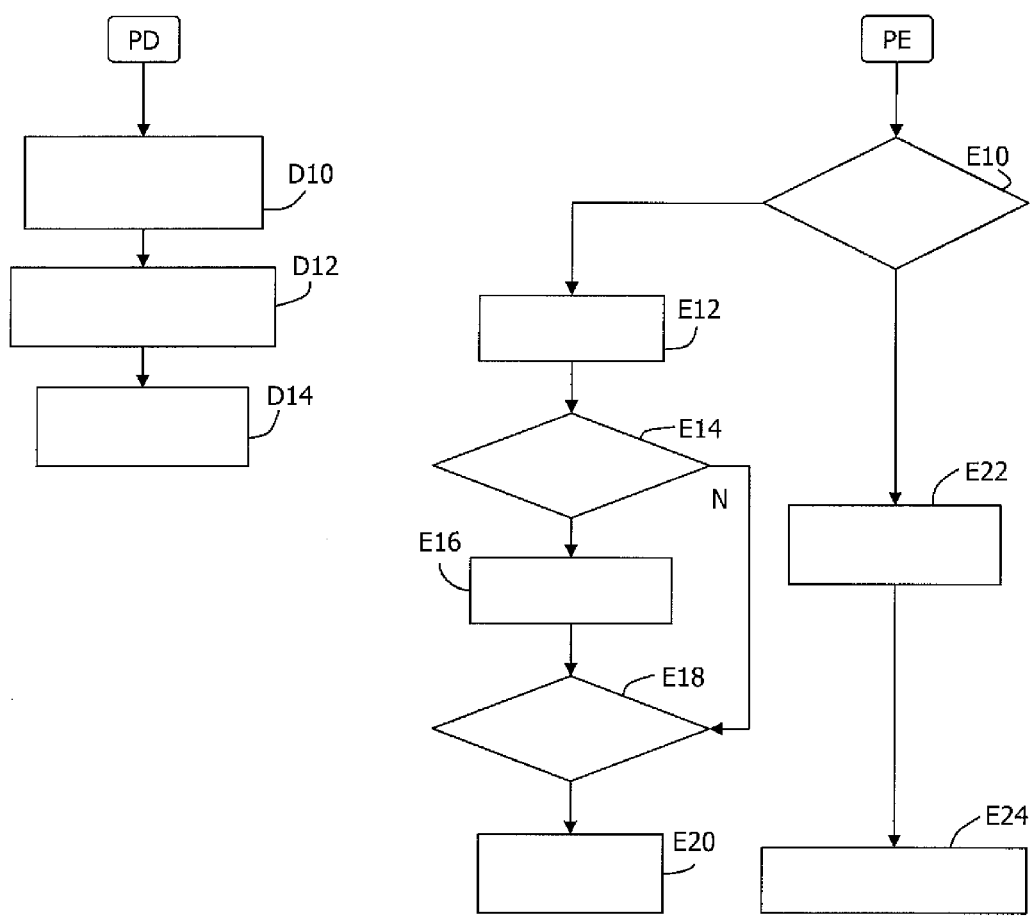
FIG. 5 represents in flowchart form the main steps of discovering an access point and discovering and maintaining up-to-date the topology network in one particular implementation of the invention.

FIG. 5 represents in flowchart form the processes PD (steps D10 to D14) and PE (steps E10 to E14) respectively executed by the access point 30 and by the nodes of the network to effect the above discoveries.

During a step D10, the access point 30 broadcasts the advertisement message GWADV (Gateway ADVertisement) with a depth of one hop (TTL=1), this message containing the identifier of the access point 30.

The step E10 of the process PE is executed each time that a node receives a message.

When a node receives the advertisement message GWADV, it updates its routing table 15 during a step E12.

Then, during a test E14, it determines whether its status registered in its routing table 15 is R (registered), I (intermediate) or N (null).

If its status is R or I, the test E14 is followed by a step E16 during which it broadcasts the advertisement message GWADV with a depth of one hop.

Then, during a test E18, the node determines whether its status stored in its routing table is R (registered) or N (null). A node of status N that has received the advertisement message is one hop from a node of status R or I.

If this is the case, during a step E20 the node sends an RREP-PA (Path Accumulation) message to the access point 30 therefor to update its topology table 35. Remember that such a message is used to accumulate an end-to-end route between a source node and a destination node. In practice, all the intermediate nodes insert their own identifier. In the particular implementation described here, each of the nodes also inserts quality of service information (QoS_info) relating to the link over which it received the message. This QoS_info information is used by the access points to select routes as described below with reference to FIG. 7.

The destination address of the message RREP-PA is that of the access point 30.

Thus only nodes of status R registered with the access point 30 and nodes one hop from a registered node (status N) or an intermediate node (status I) respond to the advertisement message GWADV. This limits the control messages exchanged between the nodes. Moreover, the knowledge of a near environment of the intermediate nodes and the registered nodes facilitates node mobility management.

If a node receives the message RREP-PA during the general message receiving step E10, it updates its routing table 15 during a step E22 with the route between itself and the source node of the message contained in the message and then forwards the message during a step E24.

The access point 30 receives the message RREP-PA during a step D12.

During a step D14, the access point 30 extracts from the message the route between itself and the source node that sent the message and updates its topology table 35 with this route (Next field) and the status R or N of the sender. Nodes that have responded to the advertisement message GWADV are active nodes in the sense of the invention.

During this same step D14, the access point stores in the topology table 35 for each node of the route included in the message RREP-PA the first node enabling that node to be reached.

The access point 30 also stores in a list L of said topology table the route between the node that sent the message and the access point extracted from said message RREP-PA.

The list L is in particular used afterwards to determine all possible routes between the source node S and the destination node D.

The mechanism for discovering the access points 30, $30_1$ and the topology of the hybrid network 1 is repeated periodically, at the initiative of these access points, by broadcasting advertisement messages GWADV.

How a route between the source node S and the destination node D is selected in one particular implementation of the invention is described below with reference to FIGS. 6 and 7.

This discovery mechanism involves the source node S, the access point 30, and possibly other nodes of the network or other access points $30_1$.

Figure 6:
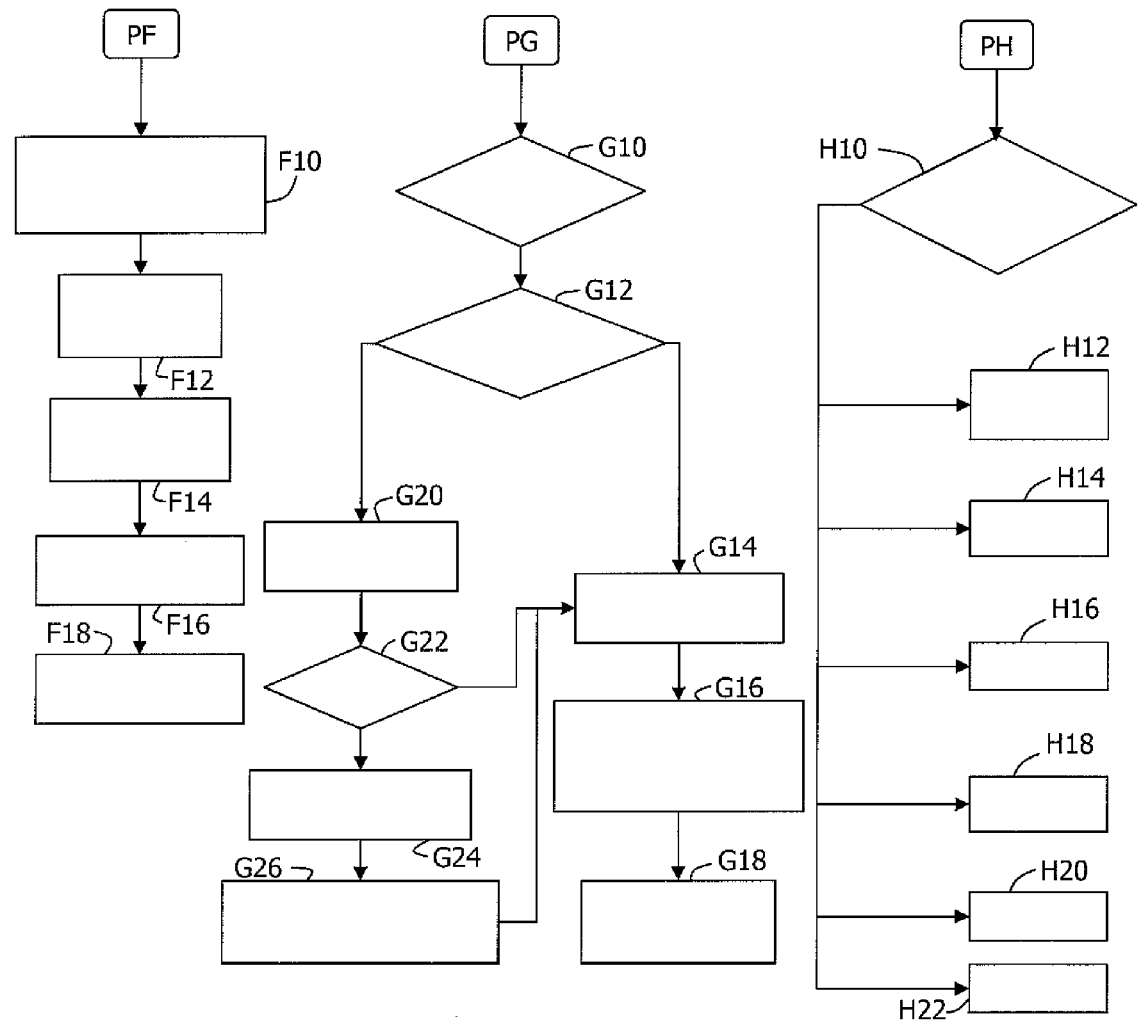
FIG. 6 represents in flowchart form the main steps of discovering a route in one particular implementation of the invention.

FIG. 6 shows in flowchart form the discovery processes PF (steps F10 to F18), PG (steps G10 to G26), and PH (steps H10 to H22) respectively executed by the source node S, the access point 30 and the other nodes of the network.

During a step F10, the source node S sends the access point 30 a request RREQ including a quality of service field QoS-_field and an address D of the destination node, the source address of this request being the address of the source node S and its destination address being that of the access point 30.

The step H10 of the process PH is executed each time that a node receives a message.

If a node receives the message RREQ during this step H10, it forwards it to the access point 30 during a step H12. The source node S normally being registered with the access point 30, the intermediate nodes between the source node S and the access point 30 already know a route stored in their respective routing table 15 for routing the message RREQ to this access point 30.

The access point 30 receives the message RREQ during a step G10.

During a test G12, it verifies whether the destination node D is stored in its topology table 35.

If so, during a general step G14, to be described below with reference to FIG. 7, it selects a route between the source node S and the destination node D from all possible routes between those nodes that it can deduce from the list L in its topology table 35.

Once this route has been selected, the access point 30 enriches its active connection table 36 during a step G16 with:

the information obtained in the request RREQ: addresses of source S, destination D, and quality of service information QoS_info; and the route between these nodes S, D selected in the step G14.

During a step G18, the access point 30 sends the source node S a message RREP, the source address of this message RREP being the address of the access point 30 and its destination addresses being that of the source node S. This message RREP includes the route between the source node S and the destination node D and the quality of service parameters QoS_param actually available on that route.

If a node receives this message RREP during the general message receiving step H10, it transfers this message to the source node S during a step H14 using its routing table 15.

The source node S receives the message RREP during a step F12. It extracts the route selected by the access point and the quality of service parameters QoS_param and updates its routing table with this route during a step F14.

As previous stated, it may happen that the access point 30 does not know the destination node D. In this situation the result of the test G12 is negative.

In another particular implementation, the access point 30 sends a message to the source node S to inform it that the destination node D is inaccessible.

In the implementation described here, the test G12 is followed, when its result is negative, by a step G20 during which the access point 30 searches for the destination node D among the other access points 30$_1$ of the hybrid network 1.

For this it can use a ring-based search mechanism limited to those access points, for example the mechanism defined in Request For Comments RFC 3561 of the AOPV (Ad hoc On-demand Distance Vector) routing protocol.

During a test G22 the access point analyzes the result of this first search. If this first search is fruitful, the test G22 is followed by a general route selection step G14 already described.

In contrast, if the first search fails, the test G22 is followed by a step G24 during which the access point 30 initiates a ring-based search mechanism in the ad hoc network. For this it broadcasts a message RREQ in which an indicator S (Search) is set to 1. The source address of this message is the address of the access point 30 and the destination address is the address of the destination node D it is looking for. In the implementation described here, the TTL depth of this message RREQ is equal to the radius of the ad hoc network 5. The radius of the ad hoc network is defined as the maximum number of hops between the access point and a node of the network. Prior art mechanisms search for the node over an area corresponding to the diameter. Thus the invention exploits the central position of the access point and limits congestion of the ad hoc network by search messages.

When a node receives this message RREQ with the indicator S at 1 during the general message receiving step H10, it updates the default route to the access point 30 in its routing table 15 during a step H18. If the node is the destination of the message, it prepares a message RREP-PA to be sent to the access point 30 by the default route. During the same step H18, the node initiates the registration mechanism described above with reference to FIG. 4 using the process PA. If the node is not the destination of the message RREQ, it broadcasts it.

When a node receives the message RREP-PA during the general message receiving step H10, it inserts into it its own address during a step H16 and transfers it to the access point 30, as described with reference to the step E22.

The access point receives the message RREP-PA during a step G26. It extracts from it in particular the route to the destination node D and updates its topology table 35 as described with reference to the step D14. The process PG then continues with the general route selection step G14 already mentioned and described below with reference to FIG. 7.

In the implementation described here, the source node is registered beforehand with the access point.

Alternatively, nodes having a status I or N knowing a route to the access point 30 can send the message RREQ to the access point without being registered first. Receiving the message RREQ modifies their status from I or N to R.

Figure 7:
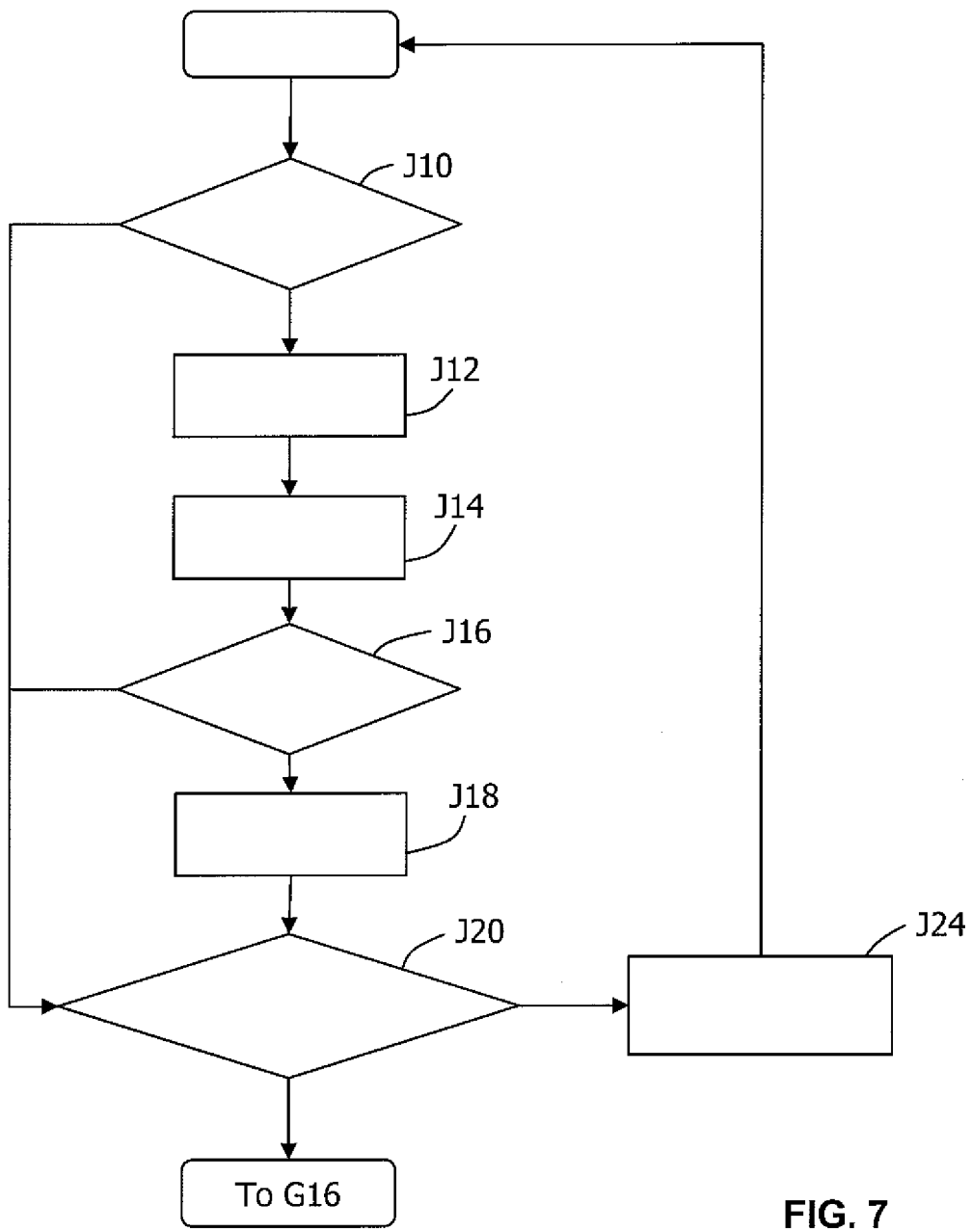
FIG. 7 represents in flowchart form the main steps of selecting a route in one particular implementation of the invention.

FIG. 7 shows a route selection mechanism used by the access point 30 in one particular implementation of the invention. It is used to explain in detail the step G14.

In the implementation described here, this selection mechanism is also used when the access point determines that a new route is available.

During a test J10, the access point 30 determines from its topology table 35 whether there possible routes between the source node S and the destination node D.

If so, the result of the test J10 is positive and this test is followed by a step J12 during which the access point 30 calculates the quality of service parameters QoS_param, for example delays, bandwidth information, and loss rates on each of the possible routes. These parameters are calculated from quality of service information (QoS_info) received by the access point 30 in the messages RREP-PA.

During a step J14, the access point 30 verifies whether the parameters QoS_param are compatible with the requirements contained in the quality of service field of the request sent in the step F10 by the source S to obtain a route. It thus eliminates routes incompatible with the requirements of the application that will use the route selected by the access point.

During a test J16, the access point 30 determines whether there are still routes that can be envisaged.

If so, the result of the test J16 is positive. This test is then followed by a step J18 during which the access point analyzes the stability of these routes. To this end, the access point 30 consults a history base of the behavior of these routes and retains the most stable routes. If the access point 30 is overloaded, it can also choose a route that does not pass through this access point. Such a history base can be located at the access point 30 or centralized on the Internet 2 and shared by a plurality of access points.

The access point 30 can also take into account a profile of the user of the source node.

When only one route remains, the access point considers it as being the route between the source node S and the destination node D to be selected.

During a test J20, the access point 30 determines whether a route has already been set up between the source node S and the destination node D.

If not, the result of the test J20 is negative and there are executed the steps G16 of updating the table 36 of active connections and G18 of sending the message RREP to the source node S already described to give it the parameters of the selected route.

In contrast, if a route has already been set up between the source node S and the destination node D, it must be determined during a step J24 if it is necessary to replace that route by the selected new route. In the implementation described, the route is changed only if a predetermined significant improvement in terms of quality of service can be obtained.

How the route between the source node S and the destination node D is set up is described below.

After extracting the selected route to the destination node D (step F14), the source node S prepares during a step F16 a message RREQ the source address of which is the address of the source node S and the destination address of which is the address of the destination node D. This message contains the end-to-end route selected and an indicator RE (Route Establishment) at 1.

The source node sends this message along the selected route during the same step F16.

When a node receives this message RREQ with the indicator RE at 1 during the general message receiving step H10, two situations arise, both of which are processed during a step H20.

If the node that receives this message is the destination node D, it responds to it by sending the source node S a message RREP in which the source address is the address of the destination node D and the destination address is the address of the source node S, the indicator RE being at 1.

If the node that receives the message RREQ is not the destination node D, it updates its routing table 15 as a function of the end-to-end route contained in the message RREQ. It then forwards the message RREQ to the Next node of the selected route for it to be routed to the destination node D.

When a node receives the message RREP with the indicator RE at 1 during the general message receiving step H10, it updates its routing table 15 during a step H22 and then consults its routing table to transfer this message to the source node S.

The source node S finally receives the message RREP with the indicator RE at 1 during a step F18.

It then considers that the selected route is set up and that it can begin to send data over that route.

The source node S can also adapt the parameters of the application as a function of the quality of service parameters QoS_param received from the access point 30 in the step F14.

The state of the topology tables 35 of the access point 30 at various stages of the selection method of the invention in one particular example are described below with reference to FIGS. 8 to 10.

FIG. 8 represents in the form of arrows messages exchanged during registration of the source node S and the destination node D with the access point 30 in the FIG. 1 hybrid network.

First, the source node S broadcasts a message RREQ 1 (step A10). The access point 30 registers the status R of the source node S in its topology table 35. Given that the source node S is one hop from the access point 30, the identifier of the node S is stored in the Next column of this table. The access point 30 responds to the message RREQ by sending a message RREP 2 (step B14).

It is assumed in parallel with this that the destination node D also sends a message RREQ 3, this message being relayed by the node J (message RREQ 4) and then by the node O (message RREQ 5) to the access point 30.

The access point 30 registers the status R of the node D in its topology table 35 and the identifier of the node O in the Next column. The access point 30 then responds to the message RREQ 5 by sending a message RREP 6 relayed by the node O (message RREP 7) and then by the node J (message RREP 8) to the destination node D.

On receiving the message RREQ 5 (respectively 6), the node O (respectively J) registers its intermediate node status I in its routing table 15.

On receiving the message RREQ 2 (respectively 8), the node S (respectively D) registers its registered node status R in its routing table 15.

In the example described here, the topology table 35 includes a Valid column representing the validity of an entry in the table. The topology table must be refreshed regularly to reflect the real topology of the network, since nodes are likely to move and/or leave the network. If information is not refreshed during a predetermined time, it becomes obsolete and its state in the Valid column changes.

Figure 9:
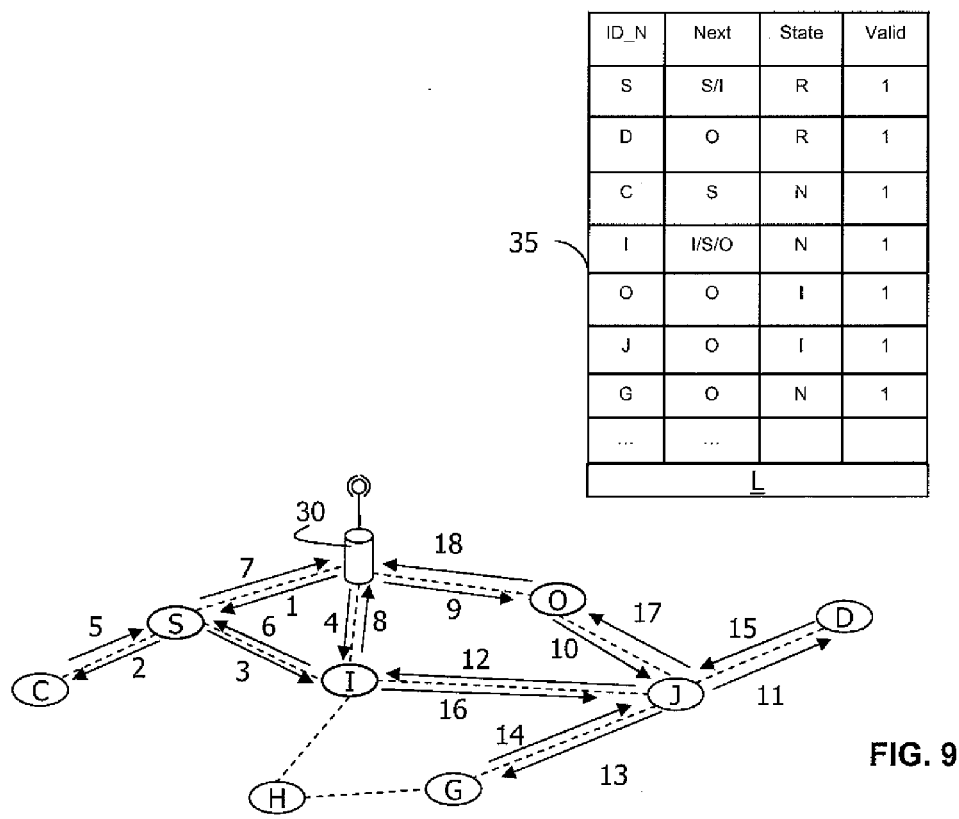

FIG. 9 shows messages exchanged during a phase of discovering the topology of the hybrid network 1.

The messages 1, 2, 3, 4, 9, 10, 11, 12, and 13 are advertisement messages GWADV broadcast by the access point 30 with a depth of one hop and relayed by the nodes S, O, and J, which have the status R or I, also with a depth of one hop.

The messages 7, 5, 6, 8, 15, 16, and 14 are RREP-PA messages in response to the above-mentioned GWADV messages. The message 17 also corresponds to RREP-PA messages corresponding to the messages 14, 15, and 16 forwarded by the node J, adding its own identity. The message 18 corresponds to these messages forwarded by the node O, adding its identity.

In the example described here, the topology table 35 includes a Valid column representing the validity of an entry in this table. The topology table must be refreshed regularly to reflect the real topology of the network, since nodes are likely to move and/or to leave the network. If information is not refreshed during a predetermined time, it becomes obsolete and its state in the Valid column changes.

The topology table 35 of the access point 30 stores the state N, R, or I of the nodes known to the access point and in the Next column the first node in each of the known routes to those nodes.

FIG. 10 shows a mechanism of the invention for selecting a route between the source node S and the destination node D.

The possible routes between the nodes S and D that can be deduced from the topology table 35 are:

route 1: S-30-O-J-D;
route 2: S-I-J-D; and
route 3: S-I-30-O-J-D.

Of these routes, only route 2 does not pass through the access point 30.

The access point 30 calculates quality of service parameters QoS_param for each of routes 1 to 3 and obtains the following result:

| Route | Hops | Delay  | Error rate | Bit rate  |
|-------|------|--------|------------|-----------|
| 1     | 4    | 200 ms | 1/1000     | 300 kbps  |
| 2     | 3    | 150 ms | 1/1000     | 100 kbps  |
| 3     | 5    | 250 ms | 1/1000     | 250 kbps  |

The access point determines the route(s) that have the best characteristics in the light of the quality of service required for the application advertised by the source node S in its request.

It is assumed that the application is of voice type and that the delay parameter is very important. The access point 30 rejects the route 3 that has an excessive delay of 250 milliseconds (ms).

The access point 30 then consults the history base of the behavior of routes 1 and 2 and learns from it that these routes are stable.

Given that route 1 passes through the access point 30 and that the access point is busy, it gives priority to route 2.

The access point 30 updates its table of active connections 36 with the parameters of the route 2.

The selected route 2 is sent to the node S in a message RREP containing the quality of service parameters QoS_param of route 2.

On receiving this message, the node S adapts the quality of service parameters of the voice application by choosing a voice coder that is efficient at a bit rate of 100 kilobits per second (kbps).

In the implementation that has just been described, the computer program of the invention stored in the read-only memory 33 of the access points 30, 30₁ includes instructions for executing:
- the process PB when registering a node;
- the process PD for discovering these access points and the topology of the hybrid network;
- the process PG and the FIG. 7 algorithm for selecting a route.

In the implementation described above, the computer program of the invention stored in the read-only memory 13 of the nodes 10 includes instructions for executing:
- the process PA when registering a node;
- the process PE for discovering these access points and the topology of the hybrid network.

The invention claimed is:

1. A method of processing an advertisement message broadcast in a hybrid telecommunications network by an access point with which at least one first node of said network has been registered by sending a registration request, this method being suitable for being used by a second node of said network, and comprising:
  sending by said second node to said access point a response message to said advertisement message;
  a first verification during which said second node verifies that it has a status representing the fact that it has not contributed to routing said registration request;
  wherein said sending is effected only if said first verification is successful.

2. The method according to claim 1 of processing an advertisement message, comprising:
  a second verification during which said second node verifies that it has a status representing the fact that it is registered with said access point or the fact that it has contributed to routing said registration request of said at least one first node toward said access point; and
  if said second verification is successful, forwarding said advertisement message to at least one node of said network taking into account a broadcasting depth included in said advertisement message.

3. A non-transitory storage medium readable by a computer and storing a computer program including instructions for executing the processing method according to claim 1.

4. A method of selecting a route between a source node and a destination node suitable for being used by an access point in a hybrid telecommunications network comprising a plurality of nodes, said method comprising:
  on receiving a registration request sent by one of said network nodes, registering in a topology table of said access point an identifier of said one of said network nodes and a route between said one of said network nodes and said access point;
  receiving messages sent by said network nodes in response to an advertisement message broadcast by said access point, said received message including a route between the node sending the message and said access point, wherein said received messages were sent by said network nodes via sending by a second node to said access point a response message to an advertisement message broadcast in said hybrid telecommunications network by said access point, wherein at least one first node of said network has been registered with said access point by sending a registration request, wherein said sending is effected only if a first verification is successful, and wherein said first verification comprises said second node verifying that it has a status representing the fact that it has not contributed to routing said registration request; and
  selecting a route from all possible routes between said source node and said destination node determined from said received response messages.

5. The selection method according to claim 4, wherein said access point registers in said topology table a route between the node sending that message and said access point extracted from said received message.

6. The selection method according to claim 4, wherein said advertisement message is broadcast by said access point with a depth of one hop and relayed in said network by the nodes of said network having a predetermined status.

7. The selection method according to claim 4, further including searching for said destination node from at least one other access point if said access point does not know said destination node.

8. The selection method according to claim 7, comprising, if said process of searching for said destination node from at least one other access point fails searching for said destination in the network using a ring-based search mechanism.

9. The selection method according to claim 4, wherein said route selection takes account of at least:
  the number of hops between said source node and said destination on each of said possible routes; or
  whether one possible route passes through said access point or not; or
  a quality of service on each of said possible routes evaluated as a function of a type of application contained in said route request.

10. A non-transitory storage medium readable by a computer and storing a computer program including instructions for executing the selection method according to claim 4.

11. A node usable in a hybrid telecommunications network including an access point with which at least one first node of said network has been registered by sending a registration request, said node comprising:
  a component configured to receive an advertisement message broadcast by said access point and possibly relayed by another node of said network;
  a component configured to verify whether the node has a status representing the fact that it has not contributed to routing a registration request; and
  a component configured to send said access point a response message to said advertisement message if said verification is successful.

12. An access point that can be used in a hybrid telecommunications network, comprising:
  a component configured to register in a topology table of said access point an identifier of at least one node of said network and a route between said node and said access point on receiving a registration request sent by said node;

a component configured to receive messages sent by nodes of said network in response to an advertisement message broadcast by said access point to only those nodes having a predetermined status, said received message including a route between the sending node and said access point;

a component configured to register said route in said topology table in association with an identifier of said sending node;

a component configured to receive a request sent by said source node to obtain a route to said destination node;

a component configured to select a route from all possible routes between said source node and said destination node determined from said received response messages; and a component configured to send said source node a message including said selected route.

13. A hybrid network including at least one access point and at least one node wherein said access point comprises:

a component configured to register in a topology table of said access point an identifier of at least one node of said network and a route between said node and said access point on receiving a registration request sent by said node;

a component configured to receive messages sent by nodes of said network in response to an advertisement message broadcast by said access point to only those nodes having a predetermined status, said received message including a route between the sending node and said access point;

a component configured to register said route in said topology table in association with an identifier of said sending node;

a component configured to receive a request sent by said source node to obtain a route to said destination node;

a component configured to select a route from all possible routes between said source node and said destination node determined from said received response messages; and a component configured to send said source node a message including said selected route;

and wherein said at least one node comprises:

a component configured to receive an advertisement message broadcast by said access point and possibly relayed by another node of said network;

a component configured to verify whether the node has a status representing the fact that it has not contributed to routing a registration request; and a component configured to send said access point a response message to said advertisement message if said verification is successful.

* * * * *

UNITED STATES PATENT AND TRADEMARK OFFICE
CERTIFICATE OF CORRECTION

PATENT NO. : 8,638,690 B2  Page 1 of 1
APPLICATION NO. : 12/669945
DATED : January 28, 2014
INVENTOR(S) : Javaid et al.

It is certified that error appears in the above-identified patent and that said Letters Patent is hereby corrected as shown below:

Title Page (item 75, Inventors) at line 2, Change "Talance" for Toufik Ahmed to --Talence--.

In the Claims

In column 13 at line 40, In Claim 1, change "verities" to --verifies--.

Signed and Sealed this
Thirtieth Day of September, 2014

Michelle K. Lee
*Deputy Director of the United States Patent and Trademark Office*